US011610169B1

(12) United States Patent
Chen et al.

(10) Patent No.: US 11,610,169 B1
(45) Date of Patent: Mar. 21, 2023

(54) DYNAMIC PREDICTION MODELING

(71) Applicant: Wells Fargo Bank, N.A., San Francisco, CA (US)

(72) Inventors: Jie Chen, Fremont, CA (US); Weicheng Liu, Winston Salem, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/896,943

(22) Filed: Jun. 9, 2020

Related U.S. Application Data

(63) Continuation of application No. 14/806,098, filed on Jul. 22, 2015, now Pat. No. 10,699,233.

(51) Int. Cl.
*G06Q 10/06* (2012.01)
*G06Q 10/0635* (2023.01)

(52) U.S. Cl.
CPC .................. *G06Q 10/0635* (2013.01)

(58) Field of Classification Search
CPC .................. G06Q 10/0635; G06N 5/02
USPC .................................................. 705/7.28
See application file for complete search history.

(56) References Cited

U.S. PATENT DOCUMENTS

| 8,762,302 | B1 * | 6/2014 | Spivack | G06N 5/02 |
| | | | | 706/12 |
| 9,361,599 | B1 * | 6/2016 | Biemer | G06Q 10/0635 |
| 9,940,374 | B2 * | 4/2018 | Orumchian | G06F 16/2228 |
| 2008/0059492 | A1 * | 3/2008 | Tarin | G06F 16/221 |
| 2008/0262890 | A1 * | 10/2008 | Korupolu | G06F 11/0793 |
| | | | | 705/7.22 |
| 2010/0332513 | A1 * | 12/2010 | Azar | G06F 16/24545 |
| | | | | 707/753 |
| 2012/0191631 | A1 * | 7/2012 | Breckenridge | G06N 20/00 |
| | | | | 706/12 |
| 2014/0046880 | A1 * | 2/2014 | Breckenridge | G06N 20/00 |
| | | | | 706/12 |

(Continued)

FOREIGN PATENT DOCUMENTS

| EP | 1107152 A2 | 6/2001 |
| EP | 1107157 A2 | 6/2001 |

OTHER PUBLICATIONS

J. Xue • X. Vera Efficient and accurate analytical modeling of whole-program data cache behavior. IEEE Transactions on Computers (vol. 53, Issue: 5, pp. 547-566). Publication date May 1, 2004 (Year: 2004).*

(Continued)

*Primary Examiner* — Abdallah A El-Hage Hassan
(74) *Attorney, Agent, or Firm* — Womble Bond Dickinson (US) LLP

(57) ABSTRACT

Dynamic predictive modelling is disclosed. A subset of joined pairs can be selected from a table of joined pairs in which each pair includes snapshot time and forecast time, the joined pairs form a forecasting triangle that spans predetermined increments of time, and the subset of joined pairs comprises a vector in the forecasting triangle. A predictive model can be utilized to operate over the data associated with the subset of joined pairs and produce a prediction. The subset of joined pairs can be dependent on the predictive model. In one instance, data associated with the subset of pairs can be loaded into processor cache to facilitate efficient processing.

20 Claims, 6 Drawing Sheets

(56) References Cited

U.S. PATENT DOCUMENTS

| | | | | |
|---|---|---|---|---|
| 2014/0089265 | A1* | 3/2014 | Talagala | G06F 16/22 707/674 |
| 2014/0330616 | A1 | 11/2014 | Lyras | |
| 2015/0310358 | A1* | 10/2015 | Khabazian | G06Q 10/067 705/7.35 |

OTHER PUBLICATIONS

Sung-Eui Yoon • P. Lindstrom [+details] Random-Accessible Compressed Triangle Meshes. IEEE Transactions on Visualization and Computer Graphics (vol. 13, Issue: 6, pp. 1536-1543). Publication date Nov. 1, 2007 (Year: 2007).*

Jain, Ankur. Statistical mining in data streams. University of California, Santa Barbara, ProQuest Dissertations Publishing, 2006. (Year: 2006).*

J. Xue X. Vera [+details] Efficient and accurate analytical modeling whole-program behavior. IEEE Transactions on Computers (vol. 53, Issue: 5, pp. 547-566). Publication dated May 1, 2004 (year: 2004).

Sug-Eui Yoon P. Lindstrom [+details] Random-Accessible Compressed Triangle Meshes. IEEE Transactions on Visualization and Computer Graphics (vol. 13 Issue: 6, pp. 1536-1543). Publication dated Nov. 1, 2007 (Year: 2007).

Jain, Ankur Statistical mining in data streams. University of California, Santa Barbara, ProQuest Dissertations Publising, 2006. (Year: 2006).

\* cited by examiner

DYNAMIC PREDICTION MODELING

CROSS REFERENCE TO RELATED APPLICATIONS

This application is a continuation of U.S. patent application Ser. No. 14/806,098, filed Jul. 22, 2015, and entitled "DYNAMIC PREDICTION MODELING," which is incorporated herein by reference.

BACKGROUND

The manner in which financial institutions manage risk is under increasing scrutiny. For example, government regulators require that financial institutions both evaluate existing risk as well as forecast risk based on changing market conditions. Federal regulators specifically require that financial institutions stress test their portfolios by creating models that reflect the financial institution's portfolios. The models offer insight into the sensitivity of the portfolio now and in the future. This modeling requires massive amounts of data to be stored, managed, and manipulated. Moreover, the resulting manipulated data and models then have to be stored, managed, and manipulated. Given how massive the data, manipulated data, and models are, the modeling requires substantial and increasing amounts of storage, processing power, time, and resources.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1A:
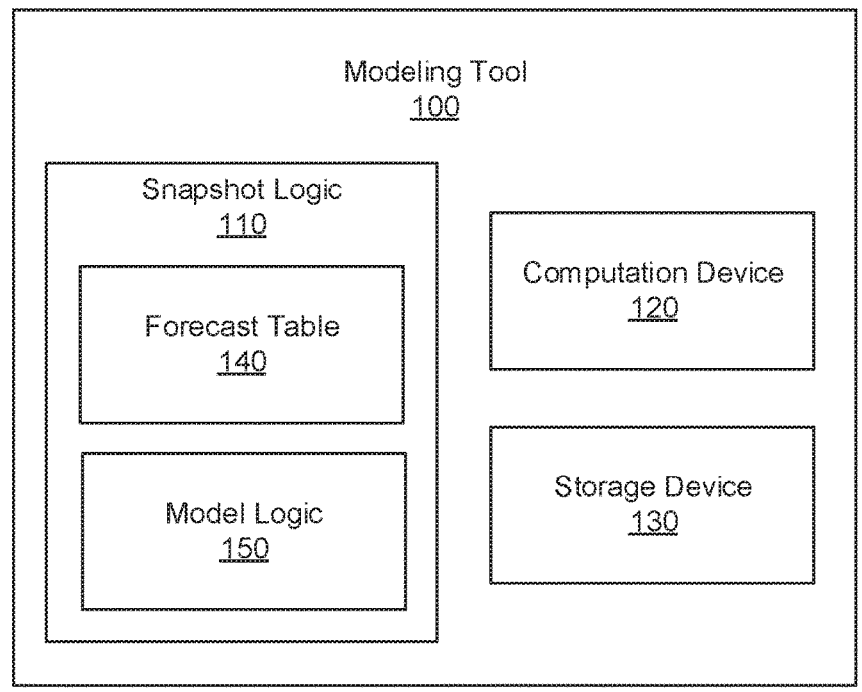
FIG. 1A illustrates one embodiment of a modelling tool associated with dynamic prediction modelling.

A stress test is an analysis or simulation designed to determine the ability of a given financial instrument or financial institution to deal with a possible economic crisis. Instead of performing financial forecasting on a best estimate, a financial institution or government regulators may perform stress testing to determine how robust a financial instrument would be in a potential economic event, such as a crash. A stress test may include scenario based analysis such as semi-annual internal bank holding company (BHC) stress testing, annual Comprehensive Capital Analysis and Review (CCAR), or the Dodd-Frank Act Stress Tests (DFAST). Stress test models are used to forecast losses based on different economic scenarios. The forecasted losses are then used to determine capital requirements under baseline and stressed economic conditions.

A predictive model is used in forecasting. Specifically, the predictive model models probabilities of various termination events, such as default and prepayment. There may be hundreds of variables for predictive models, including data from internal resources (e.g., data accumulated by the financial institution regarding customers, accounts, asset management, etc.) or external resources (e.g., bureau data, market information, etc.). The variables may vary by different lines of business due to the unique features of different credit products.

To create models for forecasting, financial institutions typically access records in a memory and move the records to a computer processing unit (CPU) for manipulation. For example, records may be moved from memory to be joined in a relational table. Two records of data may be joined in pairs of varying time horizons. In addition to accounting for varying time horizons, the joined records may include many-to-many joined records. Accordingly, the records may be linked and re-linked into an ever larger relational table. As discussed above, storing, managing, and manipulating the data in the data records as well as storing, managing, and manipulating the relational table can become increasingly cumbersome. Furthermore, the movement of data records creates two data processing bottlenecks for the model. The first bottleneck is based on loading the data from storage space to memory. The second bottleneck is based on moving data from the memory to CPU cache for computing. The lead-time on the data loading is typically prolonged and/or causes the original data to swell.

Described herein are examples of systems, methods, and other embodiments associated with dynamic predictive modeling. Rather than moving data to and from a memory, the raw data is accessed in the memory. Thus, the CPU does the work where data resides. In other words, the CPU calls the function by an address not by a value. Therefore, the redundant information movement is eliminated and the bottleneck may be resolved. Accordingly, the computing system is able to operate more efficiently.

The systems, methods, and embodiments are described in specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with dynamic predictive modeling.

FIG. 1 illustrates one embodiment of a modelling tool 100 associated with dynamic prediction modelling. The modelling tool 100 includes a snapshot logic 110, a computation device 120, and a storage device 130. The snapshot logic 110 includes an example forecast table 140 and a model logic 150. The computation device 120 and the storage device 130 may be components of a computing system. For example, the computation device 120 may be a central processing unit, computer processing unit, graphics processing unit, and so on. Likewise, the storage unit 130 may be volatile memory (e.g., random access memory (RAM), static RAM, dynamic RAM), non-volatile memory (e.g., flash memory, magnetic computer storage devices), or collection of data such as a database or table.

The snapshot logic 110 facilitates modelling performed by the computation device 120 by efficiently accessing the storage device 130. Specifically, the snapshot logic 110 reduces the amount of traffic between the computation device 120 and the storage device 130. For example, rather than the computation device 120 repeatedly reading and writing data to and from the storage device 130, the snapshot logic 110 prepares the data for modeling. In one embodiment, the snapshot logic 110 prepares data for modeling by using a snapshot time to forecast performance at some future time.

The snapshot logic 110 uses the variable at a certain time defined as the snapshot time for modelling. The snapshot time may be the current time and reflect the data as it is currently known. The forecast time is at a time in the future relative to the snapshot time. Specifically, the forecast time is the time for which a predictive model is selected. The snapshot logic 110 defines a forecast pair that includes the snapshot time and the forecast time. As an example, the performance of a loan may be predicted for a future time point (t) based on snapshot time (s). Consider that the data for the loan is as follows in Table 1.

TABLE 1

Panel Data for a Single Loan

| Time | Age | Amount | FICO | Delinquency | UnEm | Default |
|---|---|---|---|---|---|---|
| 2013Mar (3) | 1 | 125000 | 675 | Current | 7.2 | 0 |
| 2013Apr (4) | 2 | 125000 | 666 | Current | 7.2 | 0 |
| 2013May (5) | 3 | 125000 | 630 | 30 | 7.2 | 0 |
| 2013Jun (6) | 4 | 125000 | 620 | 60 | 7.2 | 0 |
| 2013Jul (7) | 5 | 125000 | 620 | 90 | 7 | 0 |
| 2013Aug (8) | 6 | 125000 | 620 | 120 | 6.7 | 1 |

The snapshot logic 110, associates the data by forecast pair (s, t). As forecasting is naturally forward looking, the variables at s, where s<t. For the example given above with respect to the panel data for a single loan in Table 1, possible forecast pairs are shown in Table 2.

TABLE 2

Snapshot-Forecast Pairs

| (s, t) | | Forecast Time (t) | | | | |
|---|---|---|---|---|---|---|
| Snapshot | (3, 3) | (3, 4) | (3, 5) | (3, 6) | (3, 7) | (3, 8) |
| Time (s) | | (4, 4) | (4, 5) | (4, 6) | (4, 7) | (4, 8) |
| | | | (5, 5) | (5, 6) | (5, 7) | (5, 8) |
| | | | | (6, 6) | (6, 7) | (6, 8) |
| | | | | | (7, 7) | (7, 8) |
| | | | | | | (8, 8) |

The rows of the Time column of Table 1 includes parenthetical integers (3), (4), (5), (6), (7), and (8) which are used to refer to the time of those row of Table 1 in Table 2. The example forecast table, Table 2, is given as an example of the origin of a forecast table 140. The forecast table 140 is a generalized example of the formation of forecast pairs.

Accordingly, a plurality of forecast pairs are generated by the snapshot logic 110 and stored in a forecast table 140. The model logic 150 selects a subset of the forecast pairs. In one embodiment, the model logic 150 selects a subset of the forecast pairs based on a selected model. For example, the model logic 150 may select a subset of forecast pairs based on an origination model, age segment model, calendar segment model, or horizon segment model. In another embodiment, the subset of the forecast pairs may be selected as vectorized values.

Figure 1B:
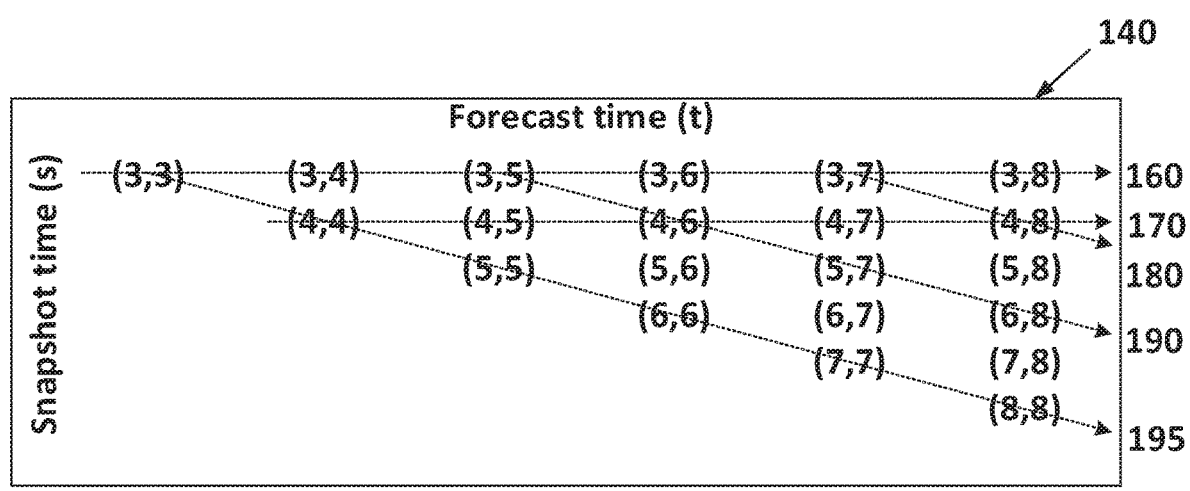
FIG. 1B illustrate example subsets of vectorized values associated with dynamic prediction modelling.

FIG. 1B illustrate example subsets of vectorized values associated with dynamic prediction modelling in a forecast table 140. For example, selecting vectorized values from the forecast table 140 includes identifying vectors of data. A vector is a line through the forecast table 140. Forecast pairs along the line through the forecast table 140 make up the subset of data.

For example, vector 160 may include joined pairs indicative of an Origination Model. Vector 170 may include joined pairs indicative of an Age/Calendar Segment Model. Vector 180 may include joined pairs indicative of a Horizon Segment Model with a specified condition. Vector 190 may include joined pairs indicative of a Horizon Segment Model with a different specified condition. Vector 195 may include joined pairs indicative of a specific case of horizon segment model but without predictive power. Accordingly, in one embodiment, vectors are selected from the forecast table 140 based on selected model. The use of horizon segment model for diagnostics (in either model validation or model development). This model overcomes the drawbacks of the industrial practice model.

Returning to FIG. 1A, the subset of forecast pairs is selected based, at least in part, on predetermined increments of time between the snapshot time and the forecast time. The predetermined increments of time are based, at least in part, on a relative shift in the data. The increments may be a predetermined amount of time between joined pairs. In another embodiment, the vectors may be based on the increments. For example, the increments may be used as a slope to calculate the trajectory of a vector through the forecast table.

The subset of forecast pairs is received by the computation device 120. Accordingly, the computation device 120 receives the data it needs to perform modeling without redundant reading and writing to the storage device 130. Using a subset of the total forecast pairs rather than each of the forecast pairs increases efficiency, both in terms of the processing performed by the computation device 120 and reduces the access to the storage unit 130.

Figure 2:
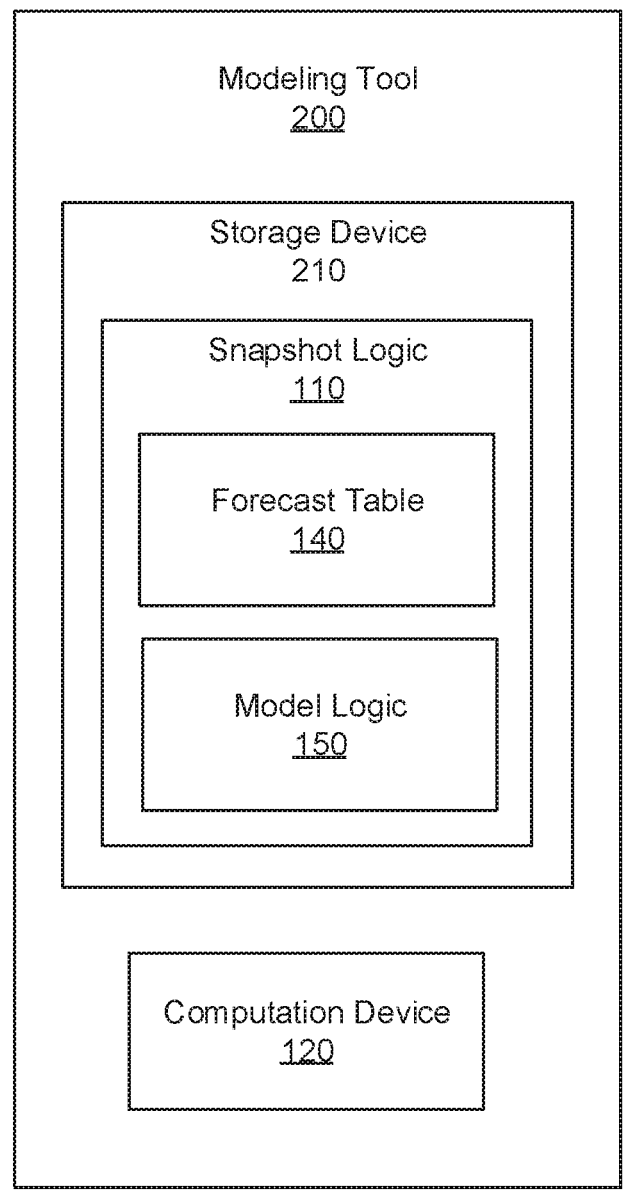
FIG. 2 illustrates one embodiment of a modelling tool associated with dynamic prediction modelling.

FIG. 2 illustrates one embodiment of a modelling tool 200 associated with dynamic prediction modelling. The modelling tool 200 includes a storage device 210. The storage device 210 operates in a similar manner as the storage device 130 of FIG. 1A. Here the snapshot logic 110 is both associated with and a component of the storage device 210. The snapshot logic 110, computation device 120, forecast table 140, and model logic 150 operate in a similar manner as described above with respect to FIG. 1.

Figure 3:
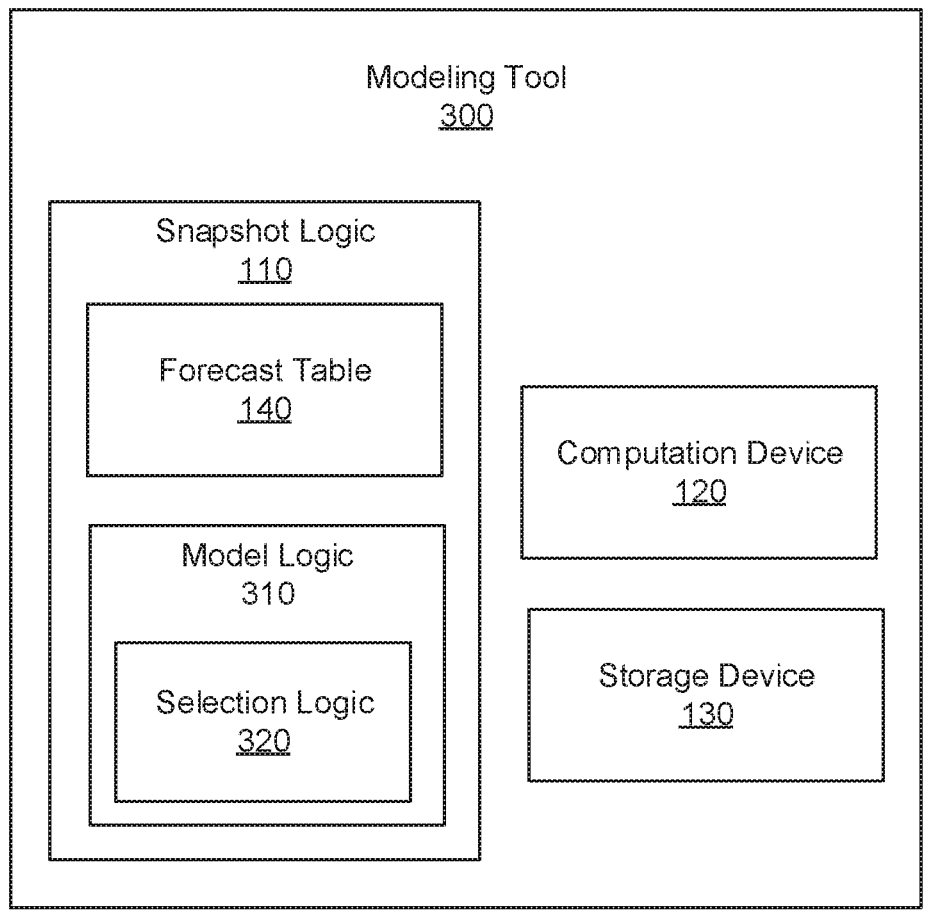
FIG. 3 illustrates another embodiment of a modelling tool associated with dynamic prediction modelling.

FIG. 3 illustrates another embodiment of a modelling tool 300 associated with dynamic prediction modelling. The snapshot logic 110, computation device 120, storage device 130, and the forecast table 140 operate in a similar manner as described with respect to FIG. 1A. The snapshot logic 110 further includes a modelling logic 310. The modelling logic 310 operates in a similar manner as the modelling logic 150 described with respect to FIG. 1A. The modelling logic 310 further includes a selection logic 320.

The selection logic receives a selection of a model. In one embodiment, the selection of the model may be an origination model, age segment model, calendar segment model, or horizon segment model. As illustrated in FIG. 1B, the prediction is based, at least in part, on the selected model.

As discussed above, a plurality of forecast pairs are generated by the snapshot logic 110 and stored in a forecast table 140. The model logic 310 selects a subset of the forecast pairs. The model logic 310 selects a subset of the forecast pairs based on a selected model. Consider that the selection logic 320 receives a selection of the horizon model. Accordingly, the snapshot logic 110 calculates forecast pairs. Specifically, the snapshot logic 110 may calculate forecast pairs according to:

$$\ln\left(\frac{h(t)}{1-h(t)}\right) = \alpha + f_1(m) + f_2(k) + \sum \beta_i X_i(o) + \sum \rho_i X_i(s) + \sum \gamma_j Z_j(t) \quad (1)$$

Where:
- t: Forecast month, based on calendar date.
- h(t): Probability of the event occurring in t, conditional upon having survived to t−1
- α: Intercept.
- m: Loan age (months on book), i.e., the time (in months) between origination and time t.
- k: Prediction horizon (months after snapshot), i.e., the time (in months) between snapshot time s and performance time t.
- $f_1(m)$: The baseline component with loan age as the time index.
- $f_2(k)$: The baseline component with prediction horizon as the time index.
- $\Sigma \beta_i X_i(o)$: Impact of loan-level factors $X_i$ at origination, t=o.
- $\Sigma \rho_i X_i(s)$: Impact of loan-level factors $X_i$ at snapshot, =s.
- $\Sigma \gamma_j Z_j(t)$: Impact of macroeconomic factors $Z_j$ at time t.

As t=k+s, Model (1) can be rewritten as $$\ln\left(\frac{h(t)}{1-h(t)}\right) = \alpha + f_1(m) + f_2(k) + \sum \beta_i X_i(o) + \sum \rho_i X_i(t-k) + \sum \gamma_j Z_j(t)$$

For the horizon segment model, we estimate a separate model for each prediction horizon, following the model specification in model (1). Thus, the formulation of the horizon segment model is listed as follows:

$$\ln\left(\frac{h^k(t)}{1-h^k(t)}\right) = \alpha^k + f_1^k(m) + \sum \beta_i^k X_i(o) + \sum \rho_i^k X_i(t-k) + \sum \gamma_j^k Z_j(t),$$

$$k = 1, \ldots, K$$

where K is the maximum horizon according to CCAR requirement. Notice that there are possibly interactions among different covariates in the model, which are not presented in the above formulation. The kth model is constructed for k-step ahead prediction. Therefore, we have k(s)-set of data for k(s) models. The above models capture the dynamic of future values of snapshot variables through dynamic regression coefficients in place of explicitly modeling the dynamics of the variables in common practice PD model.

The origination model utilizes the origination information. Thus, we take snapshot at age m=1 (i.e., time s=3 for the example loan in Table 1), and only use the pairs in the first row of Table 2 to build the model.

The Age Segment Model is an extension of the origination model where separate models are constructed for different snapshot ages, so pairs in each row are used for an individual segment sub-model. For example, for different loans, the data are aligned on the loan age; that is, m-th age segment sub-model uses all pairs from any loan as long as the snapshot is taken at age m. The Calendar Segment Model is similar to the Age Segment Model, but segments based on calendar time rather than an age. In particular, s-th calendar segment sub-model uses all pairs from any loan as long as the snapshot is taken at time s. A Horizon Segment Model uses pairs diagonally, that is, k-th diagonal entries present k-th prediction horizon segment. To be more specific, k-th horizon segment sub-model uses all pairs from any loan as long as the horizon is k (i.e., satisfies t−s=k). Accordingly, the above example embodiment illustrates that forecast pairs are calculated and selected based on the selected model.

Figure 4:
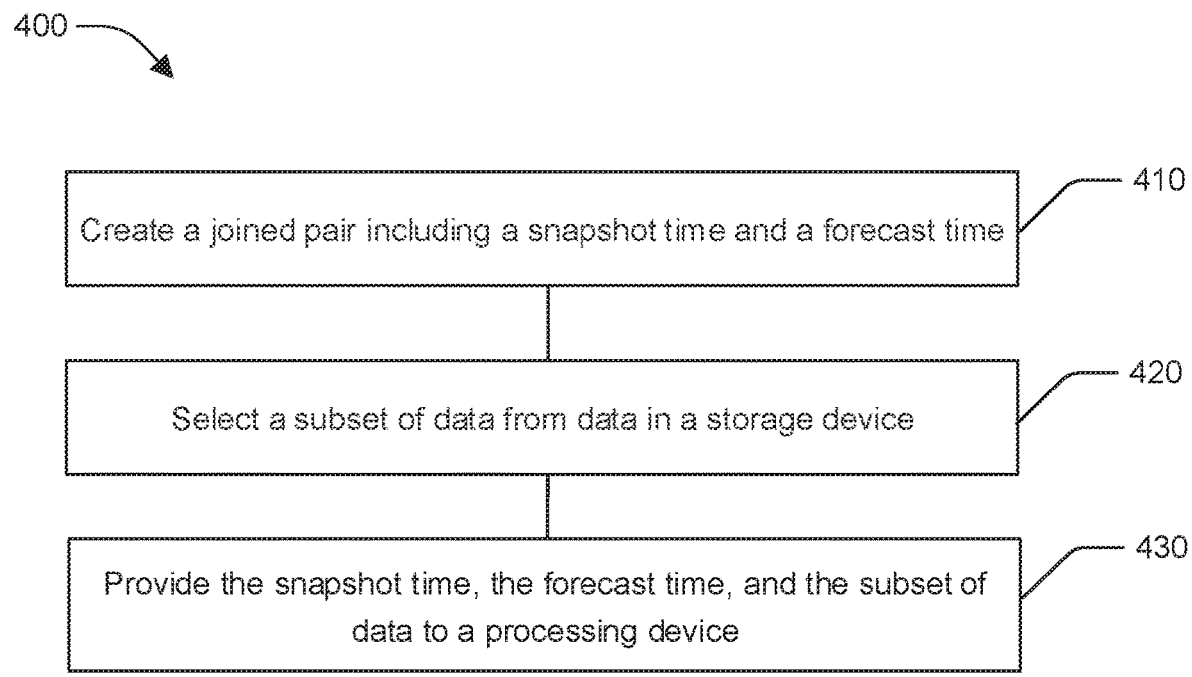
FIG. 4 illustrates one embodiment of a method associated with dynamic prediction modelling.

FIG. 4 illustrates one embodiment of a method associated with dynamic prediction modelling. At 410, a joined pair is created. The joined pair includes a snapshot time and the forecast time. The snapshot time may be the current time and reflect the data as it is currently known. The forecast time is at a time in the future relative to the snapshot time. Specifically, the forecast time is the time for which a predictive model is selected.

The storage device may contain a large set of data. At 420, a subset of data is selected within the storage device. The subset of data includes the joined pair. The subset of data also includes data based, at least in part, on the selected model and data at predetermined increments of time between the snapshot time and the forecast time. The predetermined increments of time are based, at least in part, on a relative shift in the data. For example, the relative shift may define vectorized values in the data.

In one embodiment, the data is arranged in tables in the storage device. The vectorized values are selected based on vectors in the tables. In one embodiment, the storage device stores the subset of data from the storage device to a cache memory. Accordingly, the subset of data is selected and held within the storage device or a component of the device. Thus, the subset of data does not have to be moved back and forth between the storage device and the processing device. The creation of paired value also applies to distributed data set (sub-set of data on different machines) for high performance computation. At 430, the snapshot time, the forecast time, and the subset of data are provided to a processing device from the storage device and/or the components of the storage device.

Figure 5:
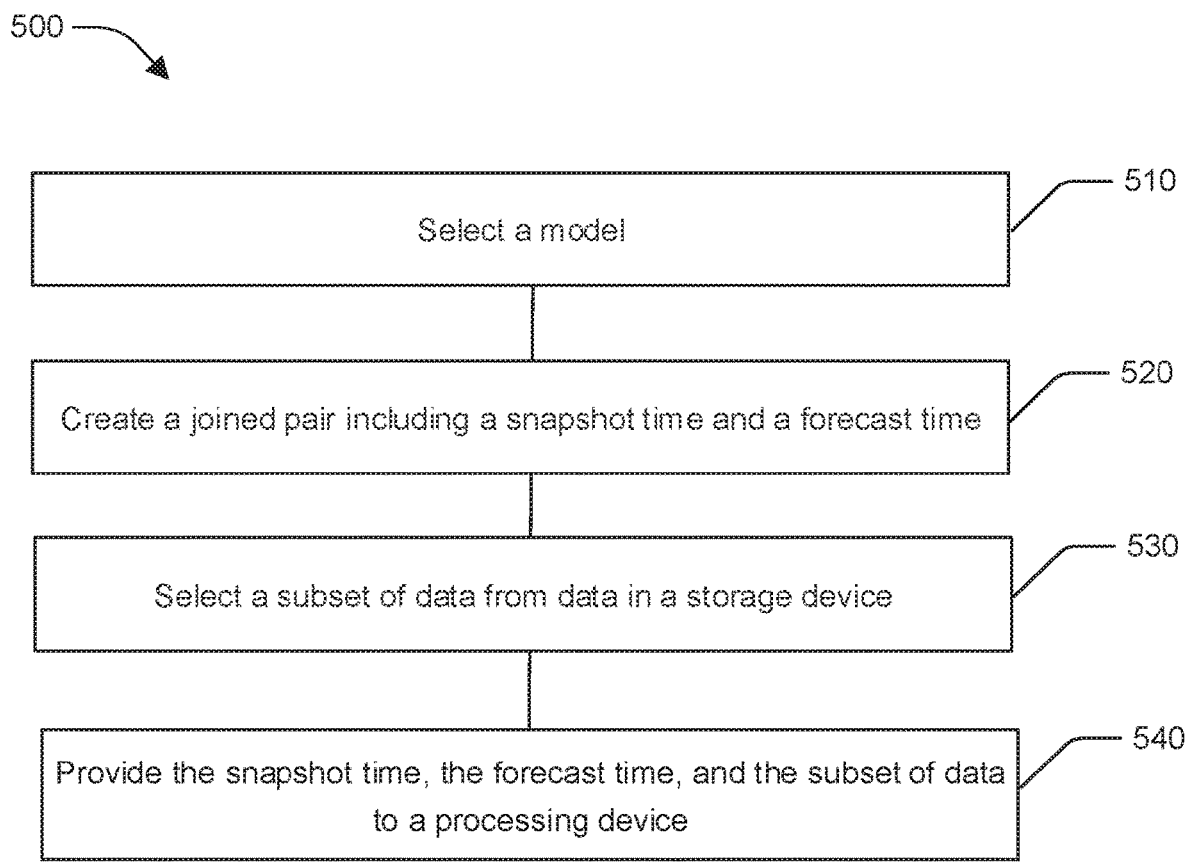
FIG. 5 illustrates one embodiment of a method associated with dynamic prediction modelling.

FIG. 5 illustrates one embodiment of a method associated with dynamic prediction modelling. At 510, a model is selected for predicting at least on value at a forecast time. The model may be one of the selection of the model, origination model, age segment model, calendar segment model, or horizon segment model. Specifically, the model may be selected based on a stress test being performed. For example, a stress test being performed for internal review may be associated with a first model and a stress test being performed for a regulator may be associated with a second model.

At 520, a joined pair is created. The joined pair includes a snapshot time and the forecast time. At 530, a subset of data is selected within the storage device. The subset of data also includes data based, at least in part, on the selected model and data at predetermined increments of time between the snapshot time and the forecast time. The predetermined increments of time are based, at least in part, on a relative shift in the data. For example, the relative shift may define vectorized values in the data. At 540, the snapshot time, the forecast time, and the subset of data are provided to a processing device from the storage device and/or the components of the storage device.

Figure 6:
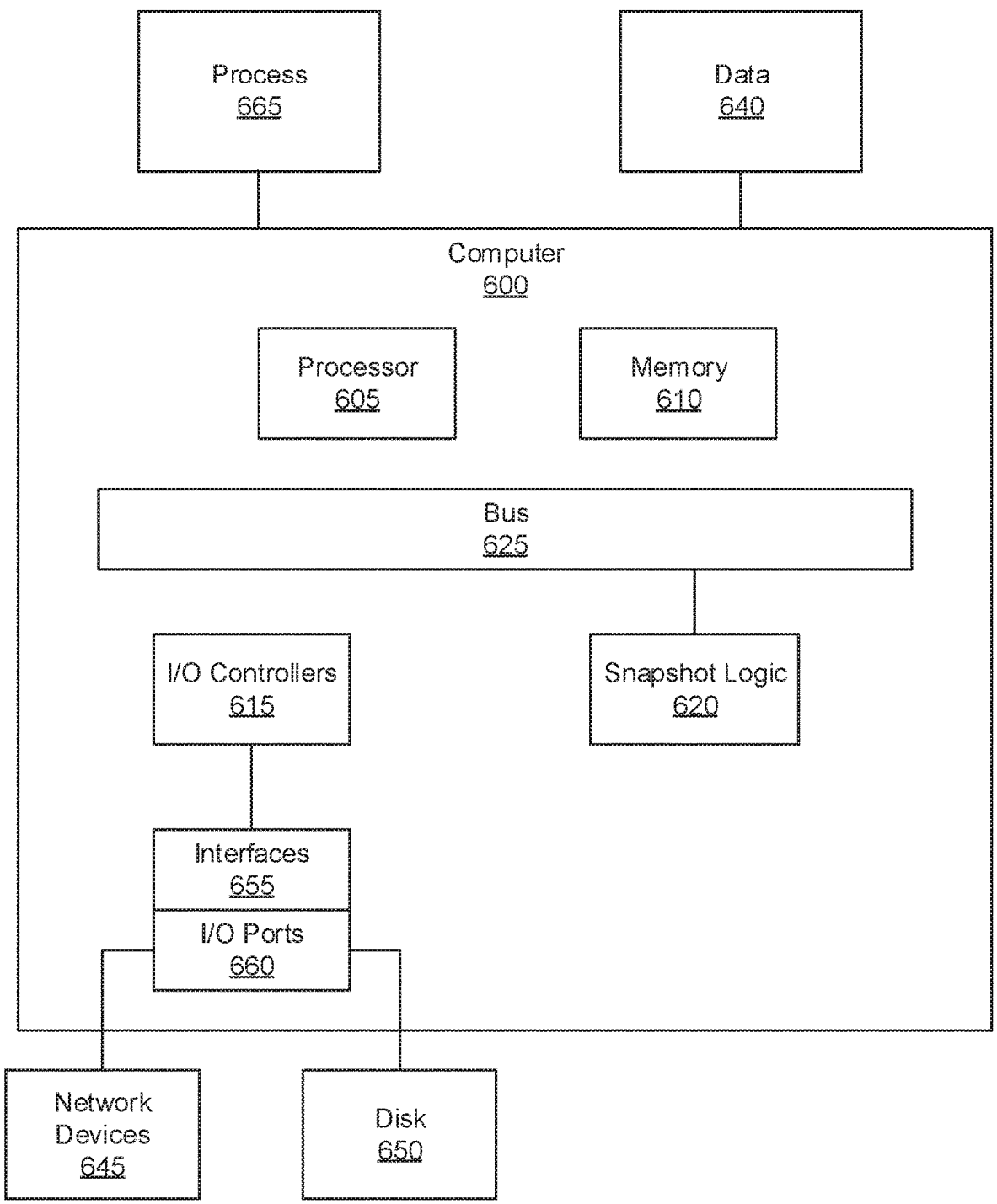
FIG. 6 illustrates one embodiment of an example computer environment associated with dynamic prediction modelling.

FIG. 6 illustrates one embodiment of an example computer environment associated with dynamic prediction modelling. The computer environment in which the systems and methods described herein, and equivalents, may operate may include a computer 600. The computer includes a processor 605, a memory 610, and input/output ports 660 operably connected by a bus 625. In one example, the computer 600 may include a snapshot logic 620. In different examples, the snapshot logic 620 may be implemented in hardware, a non-transitory computer-readable medium with stored instructions, firmware, and/or combinations thereof. While the snapshot logic 620 is illustrated as hardware components attached to the bus 625, it is to be appreciated that in one example, the snapshot logic 620 may be implemented in the processor 605.

In one embodiment, the snapshot logic 620 is a means (e.g., hardware, non-transitory computer-readable medium, firmware) to calculate forecast pairs and store the forecast table. The snapshot logic 620 further identifies a vector through the forecast table corresponding to a selected model. The means may be implemented, for example, as an ASIC. The means may also be implemented as stored computer executable instructions that are presented to computer 600 as data 640 that are temporarily stored in memory 610 and then executed by processor 605.

Generally describing an example configuration of the computer 600, the processor 605 may be a variety of various processors including dual microprocessor and other multi-processor architectures. A memory 610 may include volatile memory and/or non-volatile memory. Non-volatile memory may include, for example, ROM, PROM, and so on. Volatile memory may include, for example, RAM, SRAM, DRAM, and so on.

A disk 650 may be operably connected to the computer 600 via, for example, an input/output interface (e.g., card, device) 655 and an input/output port 660. The disk 650 may be, for example, a magnetic disk drive, a solid state disk drive, a floppy disk drive, a tape drive, a Zip drive, a flash memory card, a memory stick, and so on. Furthermore, the disk 650 may be a CD-ROM drive, a CD-R drive, a CD-RW drive, a DVD ROM, and so on. The memory 610 can store a process 665 and/or a data 640, for example. The disk 650 and/or the memory 610 can store an operating system that controls and allocates resources of the computer 600.

The bus 625 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 625 can be types including, for example, a memory bus, a memory controller, a peripheral bus, an external bus, a crossbar switch, and/or a local bus.

The computer 600 may interact with input/output devices via the i/o interfaces 606 and the input/output ports 660. Input/output devices may be, for example, a keyboard, a microphone, a pointing and selection device, cameras, video cards, displays, the network devices 645, the disk 650, and so on. The input/output ports 660 may include, for example, serial ports, parallel ports, and USB ports. Furthermore, the approach described herein is appreciated with lazy evaluation. Specifically, it benefits from the pair value indexing with the input/output ports 660.

The computer 600 can operate in a network environment and thus may be connected to the network devices 645 via the I/O interfaces 655, and/or the I/O ports 660. Through the network devices 645, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CI), other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for dynamic predictive modeling, comprising:
   a processor coupled to a storage device, and the storage device includes instructions that, when executed by the processor, causes the processor to:
   create, in the storage device, a table of joined pairs, wherein each pair of the joined pairs includes snapshot time and forecast time, wherein the joined pairs form a forecasting triangle that spans predetermined increments of time;
   select a subset of joined pairs from the table of joined pairs stored in the storage device, wherein the subset of joined pairs comprises a vector in the forecasting triangle;
   store data associated with the selected subset of joined pairs into a cache memory by moving the data from the storage device into the cache memory, wherein the cache memory is separate and distinct from the storage device;
   generate a predictive model that operates over the data associated with the subset of joined pairs; and
   predict, using the dynamic predictive modeling by operation of the predictive model directly through the cache memory to directly utilize the data moved from the storage device into the cache memory rather than retrieving the data directly from the storage device, at least one value at a forecast time,
   wherein predicting the at least one value through directly utilizing the data stored in the cache memory mitigates an iterative operation of moving the data associated with the subset of joined pairs back and forth between the processor operating the predictive model and the storage device.

2. The system of claim 1, wherein orientation of the vector in the forecasting triangle is determined based on the predictive model.

3. The system of claim 2, wherein the vector is diagonal in the forecasting triangle in accordance with a horizon segment model.

4. The system of claim 1, wherein orientation of the vector is based on a slope computed based on the predetermined increments of time.

5. The system of claim 1, wherein the snapshot time is a time for which data is known.

6. The system of claim 1, wherein the forecast time is a future time for which the predictive model produces a forecast.

7. The system of claim 1, wherein the instructions further cause the processor to determine a capital requirement based on the predicted at least one value.

8. The system of claim 1, wherein the instructions further cause the processor to compare a first result of the predictive model with a second result of a second predictive model to validate the second predictive model.

9. The system of claim 8, wherein the predictive model is a horizon segment model and the second predictive model is a stacked data model, wherein the stacked data model considers all joined pairs and the horizon segment model considers a subset of the joined pairs.

10. A method for dynamic predictive modeling, comprising:
    creating, in a storage device, a table of joined pairs, wherein each pair of the joined pairs includes snapshot time and forecast time, wherein the joined pairs form a forecasting triangle that spans predetermined increments of time;
    selecting a subset of the joined pairs from the table of joined pairs stored in the storage device, wherein the subset of joined pairs comprises a vector in the forecasting triangle;
    storing data associated with the selected subset of joined pairs into a cache memory by moving the data from the storage device into the cache memory, wherein the cache memory is separate and distinct from the storage device;

generating a predictive model that operates over the data of the subset of joined pairs; and predicting, using the dynamic predictive modeling by operation of the predictive model directly through the cache memory to directly utilize the data moved from the storage device into the cache memory rather than retrieving the data directly from the storage device, at least one value at a forecast time, wherein predicting the at least one value through directly utilizing the data stored in the cache memory mitigates an iterative operation of moving the data associated with the subset of joined pairs back and forth between a processor operating the predictive model and the storage device.

11. The method of claim 10, further comprising selecting the vector based on the predictive model.

12. The method of claim 10, further comprising selecting a diagonal vector in the forecasting triangle based on a horizon segment model.

13. The method of claim 10, further comprising determining a capital requirement based on the predicted at least one value.

14. The method of claim 10, further comprising loading the subset of joined pairs in central processing unit cache memory.

15. A computer-readable storage medium storing computer-executable instructions that, when executed by a computer, cause the computer to:

create, in a storage device, a table of joined pairs, wherein each pair of the joined pairs includes snapshot time and forecast time, wherein the joined pairs form a forecasting triangle that spans predetermined increments of time;

select a subset of joined pairs from the table of joined pairs stored in the storage device, wherein the subset of joined pairs comprises a vector in the forecasting triangle;

store data associated with the selected subset of joined pairs into a cache memory by moving the data from the storage device into the cache memory, wherein the cache memory is separate and distinct from the storage device;

generate a predictive model that operates over the data associated with the subset of joined pairs; and predict, using dynamic predictive modeling by operation of the predictive model directly through the cache memory to directly utilize the data moved from the storage device into the cache memory rather than retrieving the data directly from the storage device, at least one value at a forecast time, wherein predicting the at least one value through directly utilizing the data stored in the cache memory mitigates an iterative operation of moving the data associated with the subset of joined pairs back and forth between a processor operating the predictive model and the storage device.

16. The computer-readable storage medium of claim 15, wherein the computer-executable instructions, when executed by the computer, further cause the computer to:
select a diagonal vector in the forecasting triangle and generating a horizon segment predictive model.

17. The computer-readable storage medium of claim 16, wherein the computer-executable instructions, when executed by the computer, further cause the computer to:
compare a result of the horizon segment predictive model with another predictive model and identifying one or more differences.

18. The computer-readable storage medium of claim 15, wherein the computer-executable instructions, when executed by the computer, further cause the computer to:
determine a capital requirement based on the at least one value.

19. The method of claim 10, further comprising:
comparing a first result of the predictive model with a second result of a second predictive model to validate the second predictive model.

20. The computer-readable storage medium of claim 15, wherein the computer-executable instructions, when executed by the computer, further cause the computer to:
compare a first result of the predictive model with a second result of a second predictive model to validate the second predictive model.

\* \* \* \* \*